May 8, 1962     D. G. LOWERY     3,033,395
BUCKET CONSTRUCTION FOR A TRACTOR LOADER
Filed March 10, 1961     2 Sheets-Sheet 1
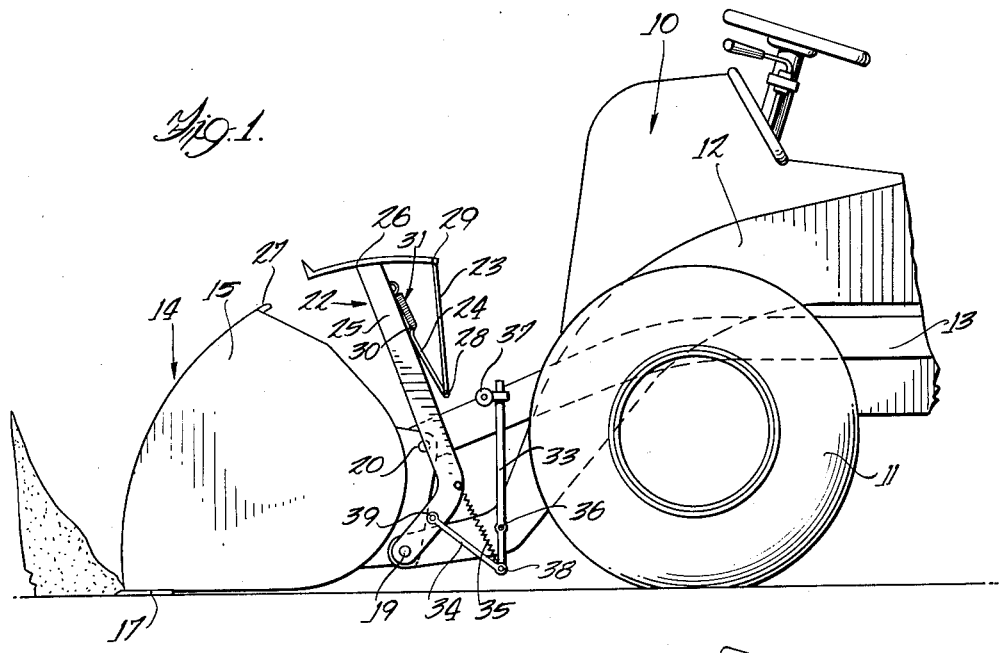
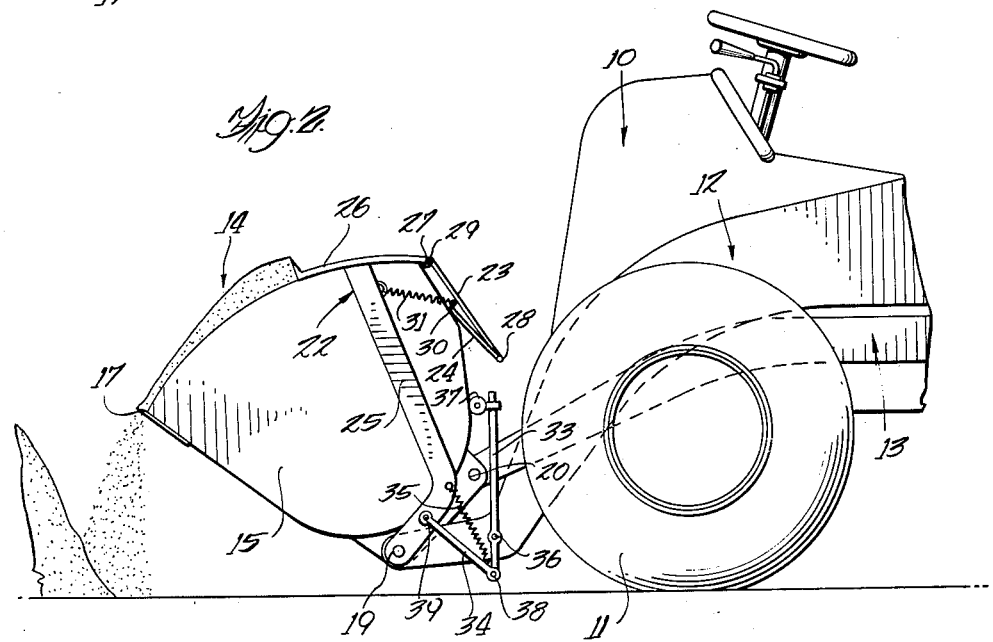
INVENTOR
DONALD G. LOWERY
ATTORNEY May 8, 1962     D. G. LOWERY     3,033,395
BUCKET CONSTRUCTION FOR A TRACTOR LOADER
Filed March 10, 1961     2 Sheets-Sheet 2
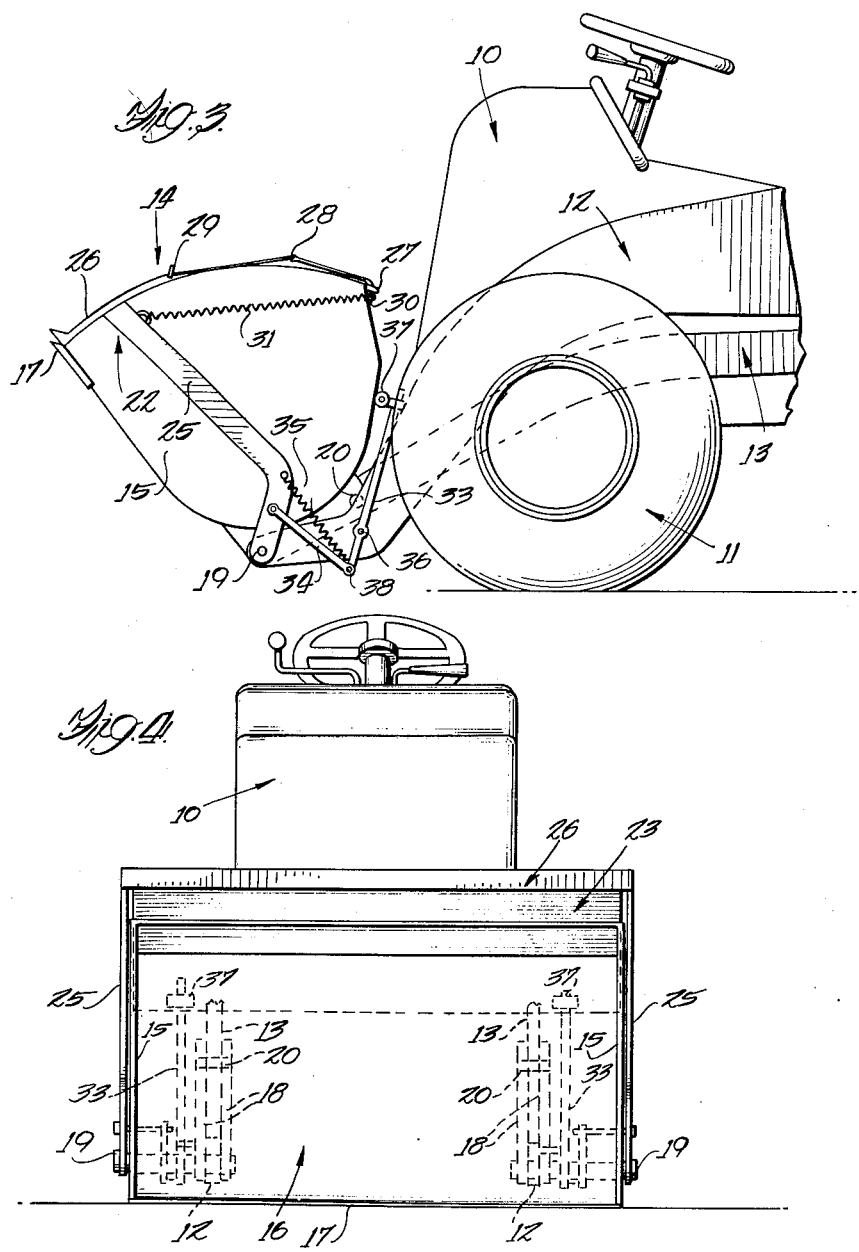
INVENTOR
DONALD G. LOWERY
ATTORNEY

United States Patent Office 3,033,395
Patented May 8, 1962

3,033,395
BUCKET CONSTRUCTION FOR A TRACTOR LOADER
Donald G. Lowery, Roselle, Ill., assignor to The Frank G. Hough Co., a corporation of Illinois
Filed Mar. 10, 1961, Ser. No. 94,911
7 Claims. (Cl. 214—140)

This invention relates generally to tractor loaders and more particularly to load-striking and covering arrangements for the bucket of a front-end-type tractor loader.

In the use of front-end-type tractor loaders for the digging and transporting of free-flowing granulated materials, a persistent problem has been the spilling of material from the bucket by jostling of the bucket during travel of the tractor. Because of the easy loading characteristics of a free-flowing granulated material, a heaped bucket generally results from the digging and filling of the bucket in a granulated material stockpile. As the tractor and bucket are withdrawn from the pile, the heaped portion is rapidly reduced in height by spillage from the bucket. This results in relatively large amounts of wasted material with much spilled material about the area of the stockpile. Further as the tractor is moved to a remote location, the jostling thereof will additionally produce excessive spillage of a free-flowing material. This problem of spillage is compounded when relatively light materials which may easily be blown from the bucket are worked.

The object of the present invention is to provide a load-striker and cover arrangement for the bucket of a front-end-type tractor loader which will enable the operator of the loader to strike off any excessively heaped material from the bucket and to then transport the loaded bucket over relatively long distances under many different types of conditions with substantially no spillage of a free-flowing granulated material from the bucket.

It is a further object of the present invention to provide a relatively simple bucket striker and cover arrangement for a front-end-type tractor loader wherein the striker and cover arrangement is actuated and operated automatically by the tilting of the bucket from a horizontally digging position to a load-carrying position with the open side of the bucket disposed substantially upwardly.

Other objects and features of the invention will become apparent upon a perusal of the following specification and drawings, of which:

FIGURE 1 is a side-elevational view of a tractor loader constructed according to the present invention;

FIGURE 2 is a view similar to FIGURE 1, but with the bucket partially tipped rearwardly toward the breakout or load-carrying position;

FIGURE 3 is a view similar to FIGURES 1 and 2 but with the bucket in the load-carrying position; and FIGURE 4 is a front-elevational view of the structure shown in FIGURE 1.

The present embodiment is the preferred embodiment, but it is to be understood that changes can be made in the present embodiment by one skilled in the art without departing from the spirit and scope of the present invention.

For a general description of the present invention, reference is made to the drawings. The tractor and loader of the subject invention may be of the type shown and described in United States Patent No. 2,822,098. The bucket is operatively carried on the forward end of the boom which may be raised and lowered to raise and lower the bucket in its various operative positions for performing the functions of digging, carrying, and dumping. The bucket is adjusted to various pivoted positions relative to the boom by linkage means connected thereto and controlled by the operator of the tractor. The subject invention comprises a U-shaped striker element having a pair of legs, one end of each of which is connected for pivotal movement about the axis of pivoting the bucket on the boom. The crossmember of the U-shaped striker element is a plate which extends transversely of the bucket and is connected to the other end of each of the legs of the U-shaped member. The crossmember is slightly curved when viewed in a vertical plane disposed longitudinally of the tractor. The legs of the U-shaped member and the crossmember are so relatively positioned that the forward edge of the crossmember will, in the pivoting of the legs, strike an arc over the open side of the bucket, which arc will also substantially define the forward marginal edges of the side walls of the bucket. When the forward marginal edge of the crossmember engages the cutting edge of the bucket, the crossmember will cover approximately one-third of the open side of the bucket. The rearward edge of the crossmember carries a pair of plates. The pair of plates are hingedly connected together and one of the plates is hingedly connected to the crossmember. The free end of the last plate is provided with transversely extending projections which are engageable with the rearward side edges of the bucket in a sliding relationship and which will engage rearwardly extending projections on the upper rear corners of the bucket when the U-shaped striker element has been pivoted over the open face of the bucket to the cutting edge. A pair of coiled springs, one on each side of the bucket, are each connected between the legs of the striker element and the end of the rearwardmost cover plate to bias the cover plates toward the legs. As may be seen in the drawings, the striker blade is movable from a position rearwardly of the bucket over the open face of the bucket to the cutting edge to carry the cover plates so that in a position such as shown in FIGURE 3, any excess load in the bucket has been removed therefrom and the open side of the bucket is substantially completely covered. A second pair of coiled springs connected between a certain leverage arrangement which is carried on the boom and connected to the striker element biases the striker element to a position such as shown in FIGURE 1. When the bucket is pivoted rearwardly from the position shown in FIGURE 1 to that shown in FIGURE 2, the rearward portion of the bucket is moved under the striker element to strike off approximately one-third of the load in the rear portion of the bucket. Further movement of the bucket from the position shown in FIGURE 2 to that shown in FIGURE 3, which is the breakout position for carrying of the load, results in a movement of the leverage arrangement by reacting against the boom to carry the striker element and cover plates completely over the open side of the bucket. In the position shown in FIGURE 3, the load may be transported to a remote location for dumping with substantially no loss of material from within the confines of the bucket and with the load in the bucket being protected from loss thereof by the cover.

For a detailed description of the present invention, continued reference is made to the drawings.

The body 10 of the tractor is supported on wheels, such as forward wheels 11, and operatively carries a boom 12 and a link 13. The boom 12 and the link 13 extend forwardly of the tractor and are controlled by the operator of the tractor in the manner disclosed in United States Patent No. 2,822,098.

The bucket 14 comprises a pair of spaced-apart side walls 15 interconnected by a curved plate 16 which defines the bottom and rear walls of the bucket. The forward marginal edge of the bottom wall of the bucket is provided with a cutting edge 17. The rear side of the bucket is provided with two pairs of flanges 18 secured in a spaced-apart relationship to each other transversely of the bucket. Each arm of the boom 12 is pivotally connected to one pair of the flanges 18 at the lower end thereof by pin means 19. The forward end of each arm of the link 13 is pivotally connected between one pair of flanges 18 substantially at the upper end thereof by pin means 20. The boom 12 may be raised or lowered at its forward end to raise and lower the bucket 14, and the link 13 may be moved to pivot the bucket 14 relative to the boom 12 about the axis of pin means 19. The forward marginal edges of the side walls 15 of the bucket have a curvature which substantially coincides with that of a portion of a circle traced with its center at the axis of pin means 19.

The striker blade and cover elements comprises a U-shaped striker element 22 and two plates 23 and 24. The striker element 22 comprises a pair of legs 25 interconnected by a crossmember 26. Each of the legs 25 is somewhat L-shaped and is pivotally carried at its lower end thereof on pin means 19. The striker plate 26 has a curvature substantially equal to that of the forward marginal edges of the side walls 15 of the bucket 14 and is provided at the forward end thereof with a load-striking edge. The striker element 22 is so arranged that when the legs 25 are pivoted about pin means 19 relative to the bucket 14, the striker plate 26 will sweep over the open side of the bucket 15 in cooperation with the curved marginal edges of the side walls 15. The width of the striker plate 26 measured longitudinally of the tractor is such that the striker plate 26 will cover approximately one-third of the open area of the bucket 14. The plates 23 and 24 have a width measured transversely of the bucket which is substantially equal to the width of the striker plate 26, and have a total width measured longitudinally of the tractor such that substantially two-thirds of the open side of the bucket 14 may be covered by the plates 23 and 24. The plates 23 and 24 are pivotally interconnected along one of their respective marginal edges by hinge means 28. The side of plate 23 opposite from hinge means 28 is hingedly connected to the trailing edge of striker plate 26 by hinge means 29. The side of plate 24 opposite from hinge means 28 is provided at each side marginal edge thereof with a transversely extending pin 30. Each of the pins 30 on the plate 24 are positioned to engage the rear marginal edges of the side walls 15 when the legs 25 of the striker element 22 are moved over the bucket 14. When the striker element 22 is disposed in a position such as shown in FIGURE 3, the pins 30 will engage the projections 27 such as shown in FIGURE 3. A pair of coiled springs 31 are provided for biasing the plates 23 and 24 somewhat downwardly and toward the legs 25 in the proper position for operation of the device. Each of the springs 31 is connected at one end thereof to one corner of the plate 24 adjacent pin 30. The other end of each coiled spring 31 is connected to one of the legs 25 of the striker element 22 near the upper end thereof.

The operating means for the striker element 22 and the plates 23 and 24, comprises a lever 33, a link 34, and a coiled spring 35, formed in duplicate portions, one on each side of the tractor. The lever 33 is pivotally carried intermediate its ends on the boom 12 at a point spaced rearwardly of pin means 19 by pin means 36. The upper end of the lever 33 carries a pad 37 which is disposed in longitudinal alignment behind the bucket 14 so that rearward pivoting of the bucket 14 will cause engagement of the rear wall thereof with the pad 37. The lower end of the lever 33 is pivotally connected to one end of the link 34 by pin means 38. The other end of link 34 is pivotally connected to the legs 25 of the striker element 22 by pin means 39. Pin means 39 is spaced on legs 25 upwardly a certain distance from pin means 19. One end of the coiled spring 35 is connected to link 34 at pin means 38. The other end of spring 35 is connected to legs 25 of striker element 22 at a position spaced upwardly from pin means 19 and 39. The coiled spring 35 is positioned to maintain the striker element 22 biased to a position substantially shown in FIGURE 1.

With the striker element 22 in the position shown in FIGURE 1, the tractor may be moved forwardly to cause the cutting edge 17 of the bucket to engage the material being worked. With a relatively free-flowing granulated material, the bucket generally may be relatively easily filled with a heaping load of the granulated material. After filling of the bucket, the bucket 14 is pivoted rearwardly, and when reaching a position such as shown in FIGURE 2, it may be seen that a portion of the heaped load has been struck from above the upper edge of the bucket by the striker blade 26, and that the rearward edges of the bucket has engaged the pad 37. Further pivoting of the bucket from the position shown in FIGURE 2 to that shown in FIGURE 3 will cause the upper end of lever 33 to be moved rearwardly or in a clockwise direction, as viewed therein, and the lower end of lever 33 will move link 34 to in turn sweep the striker element 22 over the remaining open side of the bucket. The movement of the striker element 22 over the open side of the bucket will cause the plates 23 and 24 to be carried therewith to cover the bucket in an arrangement such as shown in FIGURE 3. With the bucket in the position shown in FIGURE 3, the tractor may be moved to a remote location for dumping of the load, and as the tractor is moved substantially no losses of the free-flowing granulated material from the bucket will occur. In the dumping operation, substantially the reverse of the described operation will take place so that the forward pivoting of the bucket will cause the load-striker element 22 and the plates 23 and 24 to be removed from the open side of the bucket.

Having described the invention, what is considered new and desired to be protected by Letters Patent is:

1. A front-end-type tractor loader having a bucket operatively carried on the forward end of a boom, a load-striking and cover arrangement comprising a plurality of plates pivotally interconnected, means for carrying said plates in cooperation with said bucket whereby said plates are movable over the open side of said bucket in a load-striking operation and in a bucket-covering arrangement, said plurality of plates in total having a length and width substantially equal to the area of the open side of said bucket, and means operating responsive to the rearward pivoting of said bucket for operating said last-mentioned means.

2. A bucket construction for a tractor loader having a boom, comprising a pair of spaced-apart side walls interconnected by a bottom and rear wall, means formed on the rear wall of said bucket for pivotally carrying said bucket on the forward end of the boom so that said bucket is movable from a horizontal digging position to a certain carrying position whereby the open side of the bucket is disposed substantially upwardly, a load-striking and covering means comprising a U-shaped element of a pair of levers interconnected by a crossmember and a plurality of plates hingedly connected to said crossmember transversely of said bucket, said crossmember and said plurality of plates having a length substantially equal to the distance between said side walls of said bucket, said crossmember and said plurality of plates having a total width substantially equal to the width of the open side of the bucket measured longitudinally of the tractor, said pair of levers pivotally mounted on said bucket for pivotal movement of said levers to carry said crossmember and said plurality of plates over the open side of said bucket, said crossmember having a shape such that the lower edge thereof will strike off the upper surface of a load at the marginal edges of said side walls of said bucket when said levers are pivoted, and means operating responsive to a rearward pivoting of said bucket for pivoting said levers to move said crossmember and said plurality of plates to substantially cover the open side of said bucket.

3. A bucket construction for a tractor loader having a boom, comprising a pair of spaced-apart side walls interconnected by a bottom and rear wall, a cutting edge carried on the forward marginal edge of said bottom wall, means formed on the rear wall of said bucket for pivotally carrying said bucket on the forward end of the boom so that said bucket is movable from a horizontal digging position to a certain carrying position whereby the open side of the bucket is disposed substantially upwardly, a load-striking and covering means comprising a U-shaped element of a pair of levers interconnected by a crossmember and a plurality of plates hingedly connected to said crossmember transversely of said bucket, said crossmember and said plurality of plates having a length substantially equal to the distance between said side walls of said bucket, said crossmember and said plurality of plates having a total width substantially equal to the width of the open side of the bucket measured from the cutting edge thereof to the upper marginal edge of the rear wall thereof, said pair of levers pivotally carried relative to said bucket for pivotal movement of said levers to carry said crossmember and said plurality of plates over the open side of said bucket, said crossmember having a shape such that the lower edge thereof will strike off the upper surface of a load at the marginal edges of said side walls of said bucket when said levers are pivoted, and means operating responsive to a rearward pivoting of said bucket for pivoting said levers to move said crossmember and said plurality of plates to substantially cover the open side of said bucket with said crossmember engaging said cutting edge.

4. A bucket construction for a tractor loader having a boom, comprising a pair of spaced-apart side walls interconnected by a bottom and rear wall, means formed on the rear wall of said bucket for pivotally carrying said bucket on the forward end of the boom so that said bucket is movable from a horizontal digging position to a certain maximum load-carrying position wherein the open side of the bucket is disposed substantially upwardly, a load-striking and covering means comprising a U-shaped element of a pair of levers interconnected by a crossmember and a plurality of plates hingedly connected to said crossmember transversely of said bucket, said crossmember and said plurality of plates having a length substantially equal to the distance between said side walls of said bucket, said crossmember and said plurality of plates having a total width substantially equal to the width of the open side of the bucket measured longitudinally of the tractor, said pair of levers pivotally carried on said bucket for pivotal movement of said levers to carry said crossmember and said plurality of plates over the open side of said bucket the forward marginal edges of said side walls being formed to have a curvature substantially equal to that of a portion of a circle traced therethrough and having its center at the pivotal axis of said levers, said crossmember having a shape such that the lower edge thereof will strike off the upper surface of a heaped load in said bucket at the curved marginal edges of said side walls when said levers are pivoted, and means operating responsive to a rearward pivoting of said bucket for pivoting said levers to move said crossmember and said plurality of plates to substantially cover the open side of said bucket.

5. A bucket construction for a tractor loader having a boom, comprising a pair of spaced-apart side walls interconnected by a bottom and rear wall, a cutting edge carried on the forward marginal edge of said bottom wall, means formed on the rear wall of said bucket for pivotally carrying said bucket on the forward end of the boom so that said bucket is movable from a horizontal digging position to a certain maximum load-carrying position wherein the open side of the bucket is disposed substantially upwardly, a load-striking and covering means comprising a U-shaped element of a pair of levers interconnected by a crossmember and a plurality of plates hingedly connected to said crossmember transversely of said bucket, said crossmember and said plurality of plates having a length substantially equal to the distance between said side walls of said bucket, said crossmember and said plurality of plates having a total width substantially equal to the width of the open side of the bucket measured from the cutting edge to the upper rear marginal edge of the rear wall thereof, said pair of levers pivotally mounted on said bucket for pivotal movement of said levers to carry said crossmember and said plurality of plates over the open side of said bucket, said crossmember having a shape such that the lower edge thereof will strike off the upper surface of a load at the marginal edges of said side walls of said bucket when said levers are pivoted, said pair of levers being pivotally mounted relative to the pivotal mounting of said bucket on said boom so that the open side of said bucket is moved beneath said crossmember in a load-striking and covering relationship when said bucket is pivoted initially rearwardly a certain amount, and means operating responsive to a pivoting of said bucket rearwardly a second certain amount for pivoting said levers to move said crossmember and said plurality of plates to substantially cover the open side of said bucket.

6. A bucket construction for a tractor loader having a boom, comprising a pair of spaced-apart side walls interconnected by a bottom and rear wall, means formed on the rear wall of said bucket for pivotally carrying said bucket on the forward end of the boom for pivotal movement about a certain axis so that said bucket is movable from a horizontal digging position to a certain carrying position wherein the open side of the bucket is disposed substantially upwardly, a load-striking and covering means comprising a U-shaped element of a pair of levers interconnected by a crossmember and a plurality of plates hingedly connected to said crossmember transversely of said bucket, said crossmember and said plurality of plates having a length substantially equal to the distance between said side walls of said bucket, said crossmember and said plurality of plates having a total width substantially equal to the width of the open side of the bucket measured longitudinally of the tractor, means pivotally mounting said pair of levers on said boom for pivotal movement thereof about the same axis of pivoting as the pivotal axis of said bucket on said boom, said crossmember having a shape such that the lower edge thereof will strike off the upper surface of a load at the marginal edges of said side walls of said bucket when said levers are pivoted relative to said bucket, said pair of levers and said crossmember being formed and positioned so that the open side of said bucket is partially moved under said crossmember in a load-striking and covering relationship when said bucket is initially pivoted rearwardly a certain amount, and means carried on said boom and connected to said pair of levers and operating responsive to the rearward pivoting of said bucket to said certain carrying position for pivoting said levers to move said crossmember and said plurality of plates to substantially cover the open side of said bucket.

7. A bucket construction for a tractor loader having a boom, comprising a pair of spaced-apart side walls interconnected by a bottom and rear wall, means formed on the rear wall of said bucket for pivotally carrying said bucket on the forward end of said boom for pivotal movement about a certain axis so that said bucket is movable from a horizontal digging position to a certain carrying position wherein the open side of the bucket is disposed substantially upwardly, a cutting edge carried on the forward marginal edge of the bottom wall of said bucket, a load-striking and covering means comprising a U-shaped element of a pair of levers interconnected by a crossmember and a plurality of plates hingedly connected to said crossmember transversely of said bucket, said crossmember and said plurality of plates having a length substantially equal to the distance between said side walls of said bucket, said crossmember and said plurality of plates having a total width substantially equal to the width of the open side of the bucket measured from the cutting edge thereof to the upper marginal edge of the rear wall thereof, means pivotally mounting the lower end of each of said pair of levers on said boom in cooperation with said bucket for pivotal movement of said levers to carry said crossmember and said plurality of plates over the open side of said bucket, the forward marginal edges of said side walls being formed to have a curvature substantially equal to that of a portion of a circle traced therethrough and having its center at the pivotal axis of said levers on said boom, the pivotal axis of said pair of levers on said boom being positioned to coincide with the pivotal axis of said bucket on said boom, said crossmember having a shape such that the lower edge thereof will strike off the upper surface of a load in said bucket at the marginal edges of said side walls of said bucket when said levers are pivoted relative to said bucket, and linkage and leverage means carried on said boom and connected to said pair of levers and positioned in cooperation with the rear wall of said bucket for holding said crossmember so that a portion of the open side of said bucket is moved below said crossmember in a load-striking and covering relationship when said bucket is initially pivoted rearwardly a certain amount and for moving said pair of levers responsive to a rearward pivoting of said bucket to said certain carrying position substantially cover the open side of said bucket with said crossmember engaging said cutting edge.

References Cited in the file of this patent
UNITED STATES PATENTS

| | | |
|---|---|---|
| 2,307,933 | Le Bleu | Jan. 12, 1943 |
| 2,322,458 | Le Bleu | June 22, 1943 |